Dec. 3, 1940.　　　A. F. MEYER　　　2,223,571
TRANSPORTABLE TANK
Filed Feb. 23, 1939　　　2 Sheets-Sheet 1
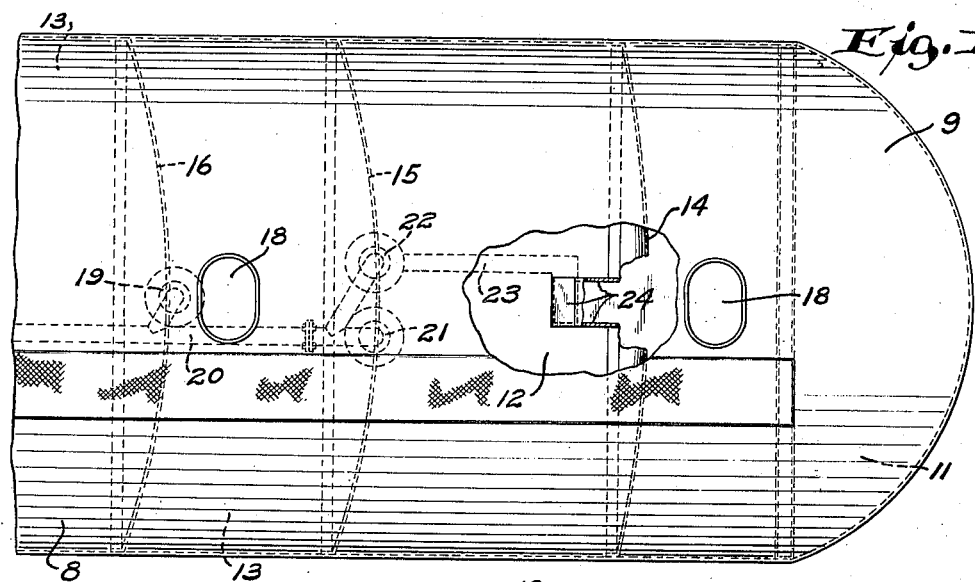
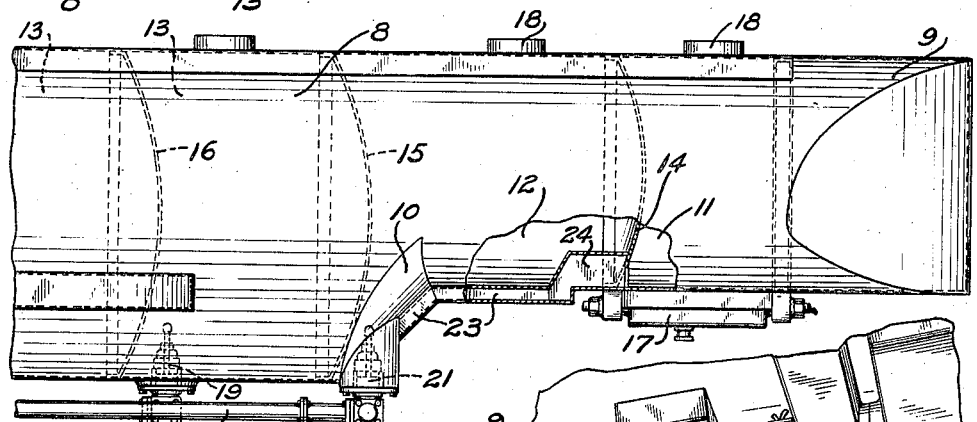
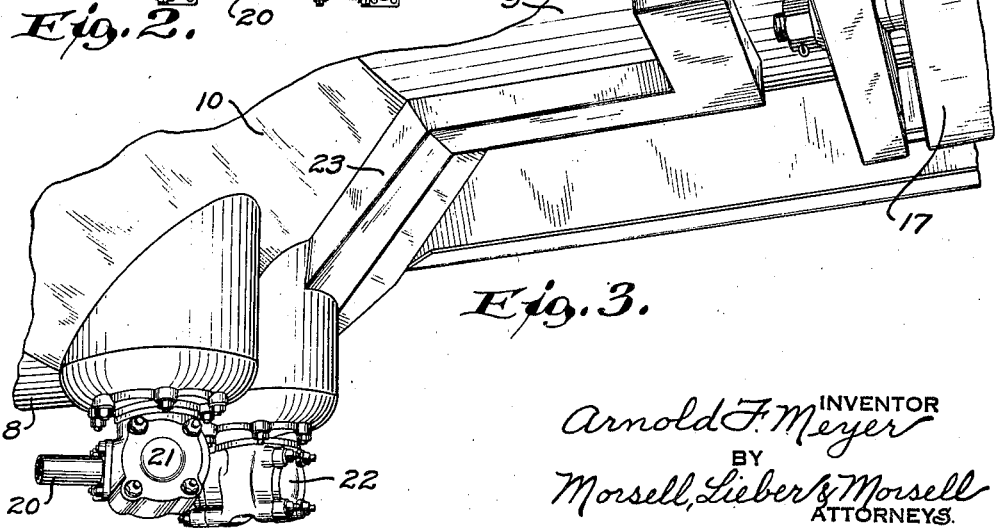

Dec. 3, 1940. A. F. MEYER 2,223,571
TRANSPORTABLE TANK
Filed Feb. 23, 1939 2 Sheets-Sheet 2
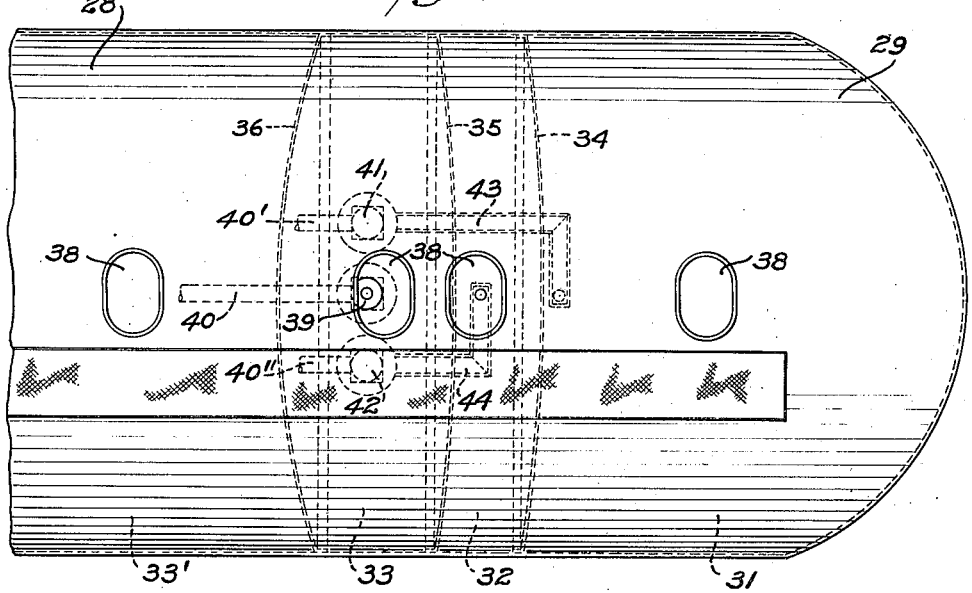
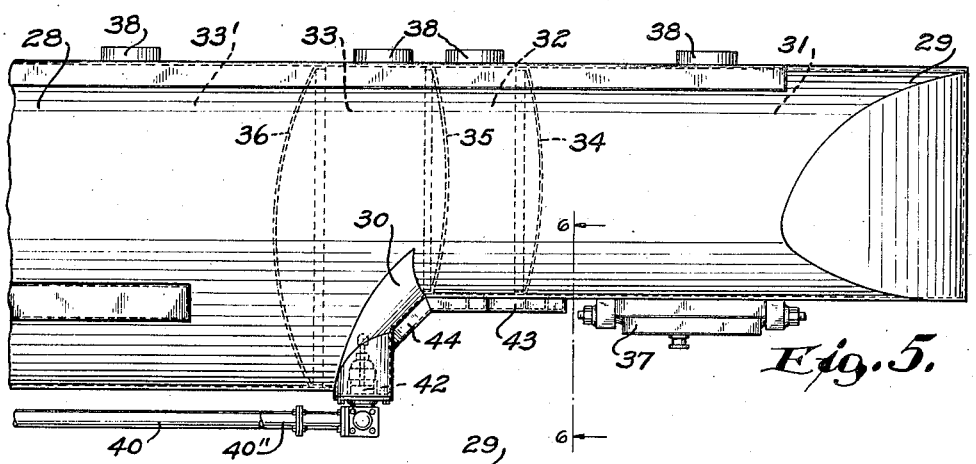
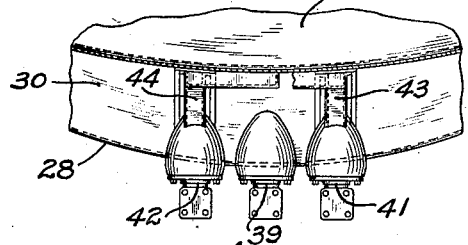
INVENTOR
Arnold F. Meyer
BY
Morsell, Lieber & Morsell
ATTORNEYS.

Patented Dec. 3, 1940

2,223,571

UNITED STATES PATENT OFFICE 2,223,571

TRANSPORTABLE TANK

Arnold F. Meyer, Pewaukee, Wis., assignor to The Heil Co., Milwaukee, Wis., a corporation of Wisconsin Application February 23, 1939, Serial No. 257,789

4 Claims. (Cl. 280—5)

The present invention relates generally to improvements in containers for transporting and dispensing liquids, and relates more specifically to improvements in the construction of multiple compartment semi-trailer tanks especially adapted for the conveyance of liquids such as gasolene, oil and the like.

Generally defined, an object of my invention is to provide a simple and efficient system for effecting dispensation of liquid from the several compartments of a tank or the like.

In the oil and gasolene distributing industry, it has heretofore been common practice to transport batches of the liquid from place to place with the aid of elongated multiple compartment tanks propelled by motor vehicles. Some of these tanks are mounted directly upon the propelling vehicles, while others are of the semi-trailer type, that is, they are provided with a rear supporting carriage independent of the draft vehicle and have their front end supported upon the rear truck of this vehicle through a fifth-wheel mechanism. In some of these semi-trailers, the forward portion of the elongated tank is of reduced height in order to accommodate the fifth-wheel assemblage, and several of the individual compartments may be disposed within the reduced tank section; and it becomes quite a problem in such structures, to make it possible to withdraw liquid from the foremost tank compartments and to dispense this liquid from the rear of the tank independently of the other compartments. Each of the individual compartments of such a multiple compartment tank, is ordinarily provided with a control valve at the bottom thereof, and in some cases a common discharge pipe connects all of these control valves with a single dispensing faucet at the rear, while in other assemblages independent discharge conduits and faucets are utilized for each of the compartments.

It is therefore a more specific object of the present invention to provide a new and useful assemblage for effecting withdrawal of liquid from the front liquid confining compartments of a semi-trailer liquid transporting tank, in a most effective manner and with simplified structure.

In accordance with my improvement, all of the liquid control valves of a multiple compartment tank having a forward end of reduced height with several compartments in the reduced portion, are disposed at approximately the same level at the bottom of the tank portion having maximum height, and the control valves for the front compartments are connected to their respective compartments by means of conduits of special construction. In this manner the construction of the front reduced portion of the tank is materially simplified, and the system for effecting withdrawal of liquid from the forward compartments avoids interfering with the fifth-wheel assemblage and with other necessary structure.

A clear conception of several embodiments of my present invention, and of the mode of constructing and of utilizing transportable multiple compartment semi-trailer tanks built in accordance with the improvement, may be had by referring to the drawings accompanying and forming a part of this specification, wherein like reference characters designate the same or similar parts in the various views.

Fig. 1 is a somewhat diagrammatic top view of the forward end portion of a semi-trailer tank having two compartments in the front reduced end, showing a portion of the tank shell and front partition broken away;

Fig. 2 is a similar side view of the tank portion of Fig. 1, with a portion of the front of the tank broken away and shown in section;

Fig. 3 is an enlarged perspective view of a fragment of the lower front portion of the tank of Figs. 1 and 2, showing the improved liquid dispensing system;

Fig. 4 is a diagrammatic top view of the forward part of another semi-trailer multiple compartment tank, showing a modified liquid dispensing system;

Fig. 5 is a similarly diagrammatic side view of the tank assemblage of Fig. 4; and Fig. 6 is a fragmentary section through the assemblage of Figs. 4 and 5, looking rearwardly and taken along the line 6—6 of Fig. 5.

In the diagrammatic illustrations appearing in the drawings, I have omitted many of the details of construction such as internal tank reenforcements, which form no essential part of my present invention, and while I have shown only two typical systems embodied in liquid transporting tanks of a particular type, it is not my intention to thereby unnecessarily restrict the scope, utility and application of the improvement.

Referring specifically to Figs. 1 to 3 inclusive, the liquid transporting tank assemblage shown therein is of the semi-trailer type having a reduced forward end and having its interior divided into a series of compartments from any of which liquid may be withdrawn to the exclusion of all others, through a single lower drain pipe having a single faucet or final dispensing valve at the rear end thereof. With specific reference to the drawings, the elongated elliptical tank 8 has a reduced forward end 9 connected to the rear tank portion by an off-set 10, and has its interior divided into a series of segregated compartments 11, 12, 13, by means of transverse partitions 14, 15, 16. A fifth-wheel assemblage 17 is associated with the bottom of the reduced tank end 9 beneath the foremost compartment 11, and each of the compartments 11, 12, 13 is provided at its top with a manhole 18 for gaining access to the interior thereof. The rear deep compartments 13 of which there may be several, are provided with control valves 19 disposed in the lower portions thereof, and these valves 19 are interposed between the compartments 13 and the single liquid dispensing pipe 20 which extends longitudinally beneath the tank 8. The intermediate compartment 12 which is located adjacent to the off-set 10, has a discharge control valve 21 similar to the valve 19, interposed between the lowest chamber portion adjoining the off-set 10 and the front end of the pipe 20. The foremost compartment 11 has a control valve 22 which is located laterally adjacent to the valve 21 and in direct communication with the common dispensing pipe 20, and the valve 22 is connected with the compartment 11 by a conduit 23 secured to the off-set 10 and to the bottom of the tank end 9, and having a front end portion 24 which extends through the lower part of the compartment 12 and penetrates the partition 14. In this manner, the front compartment 11 is provided with a drainage conduit 23 which avoids interfering with the fifth-wheel assemblage 17, and with a control valve 22 located near the lower drain pipe 20 and remote from the fifth-wheel structure.

In Figs. 4, 5 and 6, I have illustrated a multiple compartment semi-trailer tank assemblage having two compartments of reduced overall height in the front portion thereof, and provided with an independent drain conduit for each of the several liquid confining chambers. Referring specifically to this modification, the elongated horizontal tank 28 has a forward end 29 of reduced height connected to the rear part of the tank 28 by an off-set 30. The interior of the tank 28 is divided into successive segregated compartments 31, 32, 33, 33' by means of partitions 34, 35, 36, and a fifth-wheel assemblage 37 is associated with the reduced end 29 beneath the foremost compartment 31. The rear deep compartment 33' may be provided with the usual discharge control valves and with independent discharge pipes in a well known manner, and each of the tank compartments 31, 32, 33, 33' is provided with a manhole 38 for effecting access to the tank interior. The compartment 33 which is disposed at the off-set 30, has a control valve 39 at the lowermost portion thereof, communicating with a central liquid dispensing pipe 40, and other control valves 41, 42 disposed laterally adjacent to the central valve 39, control the delivery of liquid to other pipes 40', 40" from the shallow compartments 31, 32 respectively. The valve 41 is connected to the foremost compartment 31 by means of an L-shaped conduit 43, while the valve 42 is likewise connected to the rear shallow compartment by means of a reversed L-shaped conduit 44. These drain conduits 43, 44 are secured to the tank end 29 and off-set 30 rearwardly of the fifth-wheel assemblage 37, and with this system the conduits 43, 44 again avoid interfering with the fifth wheel structure and the valves 39, 41, 42 may be located remote from the fifth-wheel and at a desirably low place.

During normal use of the improved assemblage of Figs. 1 to 3 inclusive, the several compartments 11, 12, 13 will ordinarily contain quantities of the same or different liquid, and the liquid from any of these compartments may be withdrawn to the exclusion of all others, through the common drain pipe 20 by merely opening the proper control valve 19, 21, 22. During normal use of the modified assemblage of Figs. 4 to 6 inclusive, the several compartments 31, 32, 33, 33' may again contain segregated quantities of liquid of the same or of different kinds, and the liquid from any of these compartments may be withdrawn simultaneously with the withdrawal of liquid from any others, by merely opening the proper control valve 39, 41, 42. With the assemblage of Figs. 1 to 3, it is only possible to withdraw liquid from one compartment at a given time, without mixing the liquid with the contents of other compartments; but with the arrangement shown in Figs. 4 to 6 inclusive any compartment may be drained at any time without mixing the contents of the several liquid confining chambers. The control valves are operable in various ways, either from above or from beneath the tanks, and are usually selectively operable from the rear of the tank assemblage.

From the foregoing detailed description, it will be apparent that my present invention provides a simple, compact and highly effective system for effecting withdrawal of liquid from the front relatively shallow compartments of a multi-compartment semi-trailer type of transporting tank, without interfering with or interference by the fifth-wheel mechanism. The improved assemblage not only insures such withdrawal without danger of undesirable leakage and possible mixing of the compartment contents but also permits most desirable and low disposition of the control valves at a well protected zone. With the improved assemblage, standard control valves and a simplified valve actuating rig may be utilized, and manufacture of the tank assemblage is also greatly facilitated and simplified. The formation and disposition of the liquid conducting conduits for the front shallow compartments, moreover provides additional reenforcement and strength for the weaker sections of the tank assemblage, and this feature is of great importance especially in semi-trailer tanks. The present invention has proven highly practical and successful in actual commercial use, especially in connection with so-called frameless semi-trailers, and has also reduced the cost of construction of these trailers to a minimum. While I have shown the drainage conduits 23, 43, 44 attached to the exterior of the tank shells, these conduits may also be located partially or entirely within the tanks, but the control valves are preferably located near the lowest portion of the bottom of the tank and in approximately horizontal alinement with the other control valves.

It should be understood that it is not desired to limit this invention to the exact details of construction herein shown and described for various modifications within the scope of the claims may occur to persons skilled in the liquid transporting and dispensing art.

I claim:

1. In combination, an elongated vehicular tank having a front portion of reduced height connected by an off-set with the rear higher portion thereof, a front compartment disposed entirely within said reduced front portion and being sealed by a partition from the remainder of the tank interior, fifth wheel mechanism associated with said reduced portion forwardly of said off-set and beneath said partition, a control valve associated with said tank at the lower portion of said off-set, and confined conduit means rigidly attached to said tank rearwardly of said mechanism and connecting said valve with said front compartment, said conduit means extending within said tank from said partition to a point rearwardly of said mechanism and subsequently extending externally of the tank along said reduced portion and said off-set.

2. In combination, an elongated vehicular tank having a front portion of reduced height connected by an off-set with the rear higher portion thereof, a front compartment disposed entirely within said reduced front portion and being segregated from the rest of the tank interior by a liquid tight partition, fifth wheel mechanism associated with said reduced portion forwardly of said off-set and beneath said partition, a control valve associated with said tank at the lower portion of said off-set, and confined conduit means rigidly attached to said tank rearwardly of said mechanism and connecting said valve with said compartment through the bottom of said reduced portion and through said partition, said conduit means rearwardly of said mechanism being secured to the exterior of said tank and providing a reenforcing beam at said off-set.

3. In combination, an elongated tank having a front portion of reduced height, a partition forming a liquid tight compartment in said front tank portion sealed from the remainder of the tank interior, fifth wheel mechanism secured to said tank portion beneath said partition and said compartment, a valve for dispensing liquid from said compartment and being associated with a rear higher portion of said tank, and a confined conduit extending from said partition within the tank to a point rearwardly of said mechanism and subsequently extending externally of the tank to said valve.

4. In combination, an elongated vehicular tank having front and rear portions of different height connected by a bottom off-set, partition means dividing said tank into segregated independent liquid confining compartments of which the front compartment is disposed entirely within the end portion of minimum height, fifth wheel mechanism disposed beneath the front compartment and extending to the rear part thereof, a liquid control valve for said front compartment disposed near the lowest portion of said off-set, and a confined conduit connecting said compartment with said valve, said conduit communicating with said front compartment through the partition means thereof and extending internally of said tank to a point rearwardly of said mechanism and subsequently extending externally of the tank to said valve.

ARNOLD F. MEYER.